United States Patent [19]

Butts et al.

[11] Patent Number: 4,796,853

[45] Date of Patent: Jan. 10, 1989

[54] REMOTELY CONFIGURABLE SOLENOID DRIVER CIRCUIT FOR DIRECT PRESSURE ELECTRONIC TRANSMISSION CONTROL

[75] Inventors: Kenneth R. Butts, Grosse Pointe Woods; Joseph L. Wanamaker, Rochester, both of Mich.

[73] Assignee: General Motors Corporation, Detroit, Mich.

[21] Appl. No.: 136,331

[22] Filed: Dec. 22, 1987

[51] Int. Cl.$^4$ ............................................. F16K 31/06
[52] U.S. Cl. ........................... 251/129.05; 364/424.1; 74/752 D
[58] Field of Search ...................... 364/424.1; 307/318, 307/565, 571; 74/866, 867, 752 C, 752 D; 251/129.05, 129.15

[56] References Cited

U.S. PATENT DOCUMENTS

| | | | |
|---|---|---|---|
| 3,597,630 | 8/1971 | Compoly et al. | 307/318 X |
| 3,754,402 | 8/1973 | Sanders et al. | 74/752 D X |
| 4,603,268 | 7/1986 | Davis | 307/565 X |

FOREIGN PATENT DOCUMENTS

| | | | |
|---|---|---|---|
| 0065384 | 4/1983 | Japan | 251/129.05 |
| 8202236 | 7/1982 | PCT Int'l Appl. | 251/129.05 |

Primary Examiner—A. Michael Chambers
Assistant Examiner—John C. Fox
Attorney, Agent, or Firm—Mark A. Navarre

[57] ABSTRACT

A driver circuit for the solenoid actuator coils of a direct pressure electronic transmission control. The circuit is remotely configurable for satisfying the requirements of both shifting and nonshifting modes of operation. In shifting modes of operation, a common snubber element is activated to permit fast commutation of the coil current while protecting the switching devices. In nonshifting modes of operation, dedicated free-wheeling diodes are activated to circulate the coil energy at turn-off of the switching devices to facilitate reduction energy consumption and heating.

5 Claims, 5 Drawing Sheets

REMOTELY CONFIGURABLE SOLENOID DRIVER CIRCUIT FOR DIRECT PRESSURE ELECTRONIC TRANSMISSION CONTROL

This invention relates to direct pressure electronic transmission control, and more particularly to a driver circuit for energizing pressure control solenoids.

BACKGROUND OF THE INVENTION

Electronic direct pressure control of a motor vehicle automatic transmission requires the use of several solenoid operated pressure control actuators. Each actuator controls the supply of fluid pressure to a torque transmitting device (hereinafter clutch) for both nonshifting and shifting modes of operation.

During the nonshifting or steady state mode of operation, one or more clutches are maintained fully engaged and the remaining clutches disengaged. The transmission operating pressure (hereinafter line pressure) is regulated in relation to the torque to be transmitted, and the solenoid coils of the actuators associated with the active or engaged clutches are energized to provide substantially full communication between such clutches and the source of line pressure. The voltage applied to the coils in such instance may be intermittent (pulse-width-modulated) to minimize power consumption and heating, but the actuators are intended to remain fully open or fully closed as the case may be.

During shifting modes of operation, one or more clutches are being progressively engaged (on-coming) or disengaged (off-going). The transmission line pressure is still being regulated in relation to the torque to be transmitted, and the solenoid coils of the actuators associated with the on-coming and off-going clutches are intermittently energized (pulse-width-modulated) to alternately open and close the actuator supply ports for alternately supplying fluid pressure to and exhausting fluid pressure from the respective clutches. In this way, the engagement pressures of the on-coming and off-going clutches are variable according to a predetermined schedule substantially between zero and full line pressure.

To achieve the operation described above, different driver circuits are required for the nonshifting and shifting modes of operation.

In the nonshifting mode of operation, the actuators are maintained in a predetermined position (fully open or fully closed), and the drive circuit should reduce the applied voltage to minimize power consumption and heating. To reduce switching losses, this is typically achieved by pulse-width-modulating the applied voltage. However, the magnetic force of the actuator is directly proportional to the coil current and the circuit must contain elements to perpetuate the coil current between the voltage pulses in order to maintain the actuator in the desired position. This function is typically achieved by connecting a free-wheeling diode in parallel with each coil. Each time the applied voltage is interrupted, the free-wheeling diode conducts to circulate the stored energy through the coil.

In the shifting mode of operation, the actuators alternately open and close in time with the modulation of the applied voltage. This requires fast response of the actuator. From a control standpoint, this means that the coil current must be quickly reduced to zero each time the applied voltage is interrupted. However, quick interruption of the coil current results in a potentially damaging inductive voltage spike and a snubber circuit is typically employed to protect the switching device. A representative snubber circuit for such applications may comprise a Zener diode connected in parallel with the current carrying terminals of the switching device; the Zener diode in such instance limits the transient voltage across the switching device to a safe value.

SUMMARY OF THE PRESENT INVENTION

The present invention is directed to an improved driver circuit for the solenoid actuator coils of a direct pressure electronic transmission control, which circuit is remotely configurable for satisfying the requirements of both shifting and nonshifting modes of operation. The energization of each solenoid coil is controlled by a low saturation drop field effect transistor (FET). Each FET is protected during the shifting mode of operation by a dedicated diode connected in series with a shared oppositely poled Zener diode, such a series diode combination being connected across the source-drain circuit of each respective FET. The junction between each dedicated diode and the shared Zener diode is connected to the unswitched side of the actuator coil through a separately controlled switching device which is rendered conductive during nonshifting modes of operation. In this event, the Zener diode is effectively eliminated from the circuit, and the diodes of the various series diode combinations operate as free-wheeling diodes to sustain the respective actuator coil current between the FET conduction periods.

In implementation, the separately controlled switching device and the power FET's are each remotely controlled by the transmission controller. The number of driver circuit devices is minimized, and the transmission controller selectively controls the conduction of the separately controlled switching devices to appropriately configure the driving circuit for the shifting and nonshifting modes of operation.

DETAILED DESCRIPTION OF THE DRAWINGS

Figure 1:
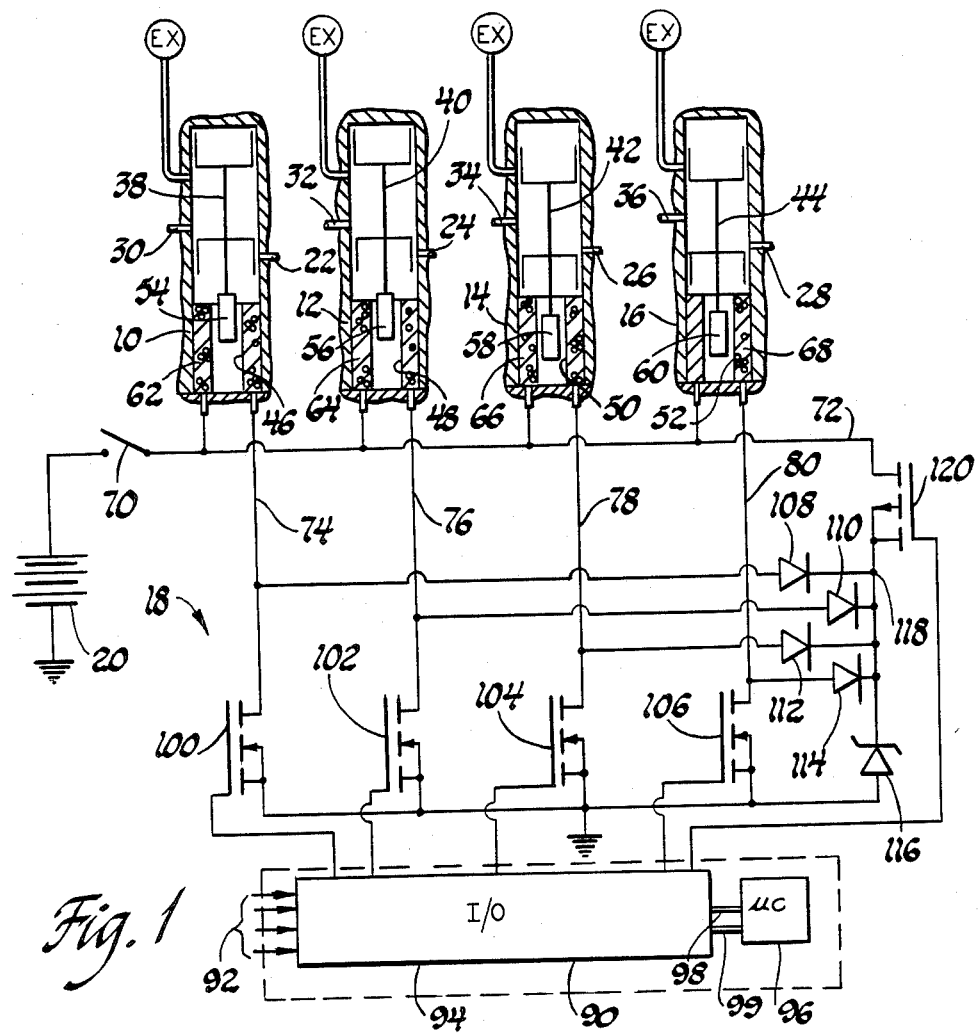
FIGS. 1 and 2 are circuit diagrams depicting alternate embodiments of the remotely configurable driver circuit of this invention, including a computerbased transmission control unit for controlling the conduction of the driver circuit switching devices.

FIG. 1 schematically depicts a set of electrically energizable fluid valves 10–16 adapted for direct pressure control of a motor vehicle transmission, and a remotely configurable driver circuit 18 according to this invention for variably energizing the valves 10–16 with current from a motor vehicle storage battery 20.

Each of the valves 10–16 receive fluid pressure at an input passage 22–28 thereof from a central source of transmission fluid pressure (not shown), and are individually energized to direct fluid at a controlled pressure via output passages 30–36 to various transmission torque establishing devices, referred to herein as clutches. Each of the valves 10-16 includes a spool element 38-44, axially movable within the respective valve body for directing fluid flow between input and output passages. When a spool element 38-44 is in the lowermost position, as viewed in FIG. 1 (valves 14 and 16), the respective input and output passages are connected. When a spool element is in the uppermost position, as viewed in FIG. 1 (valves 10 and 12), the respective input passages are cut off and residual fluid from the respective output passages is permitted to drain through an exhaust passage, indicated for each valve by the circled designation EX.

Each of the fluid valves 10-16 includes a solenoid 46-52 for controlling the position of its spool element 38-44. Each such solenoid 46-52 comprises a plunger 54-60 connected to the respective spool element 38-44 and a solenoid coil 62-68 surrounding the respective plunger. One terminal, referred to herein as the unswitched terminal, of each such solenoid coil 62-68 is connected to the positive terminal of storage battery 20 through a conventional ignition switch 70 and to the driver circuit 18 via line 72. The other terminal, referred to herein as the low side or switched terminal, of each such solenoid coil 62-68 is connected to the driver circuit 18 via lines 74-80. As described below, the driver circuit 18 is adapted to individually and selectively connect such low side terminals to ground potential for regulating the fluid pressure supplied to the transmission clutches via output passages 30-36.

While the fluid valves 10-16 have been illustrated as spool valves, other types of solenoid operated valves could be substituted therefor. By way of example, valves of the ball and seat type could be used. In general terms, the driver circuit of this invention is applicable to any pulse-width-modulatable (PWM) valving arrangement.

Figure 5:
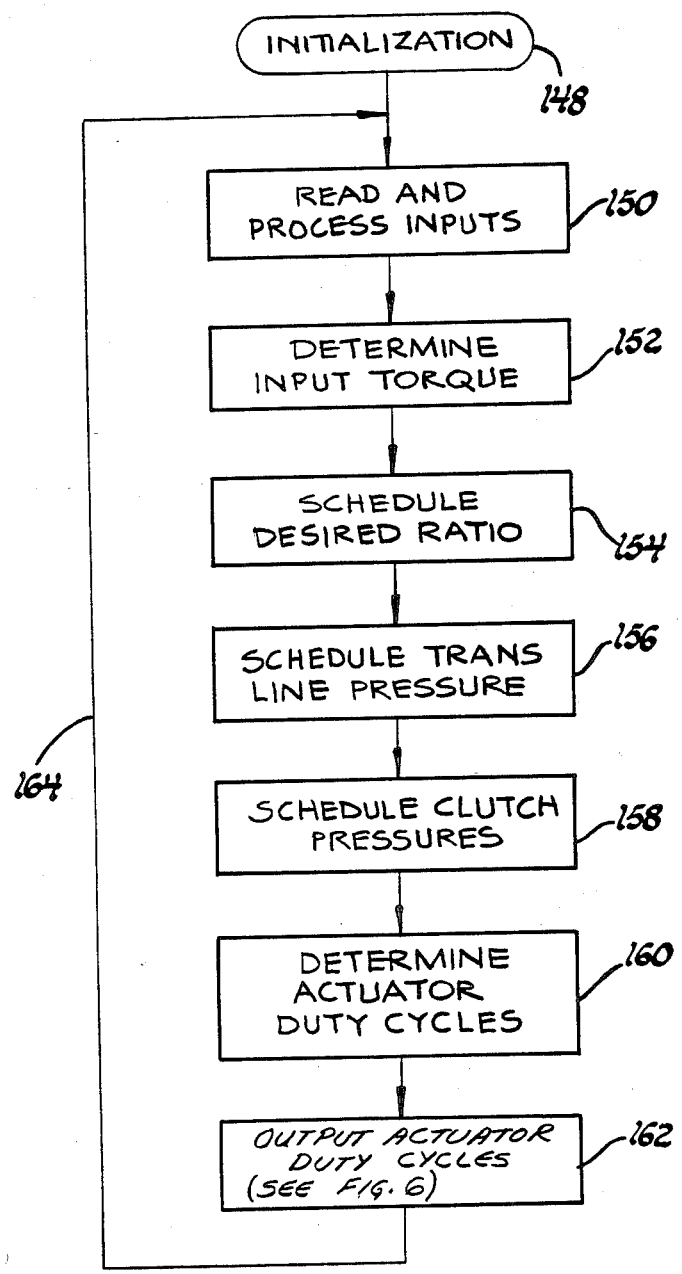
FIGS. 5 and 6 are flow diagrams representative of suitable computer program instructions executed by the computer-based transmission control unit of FIGS. 1 and 2 for remotely controlling the operation of the driver circuit of this invention.
Figure 6:
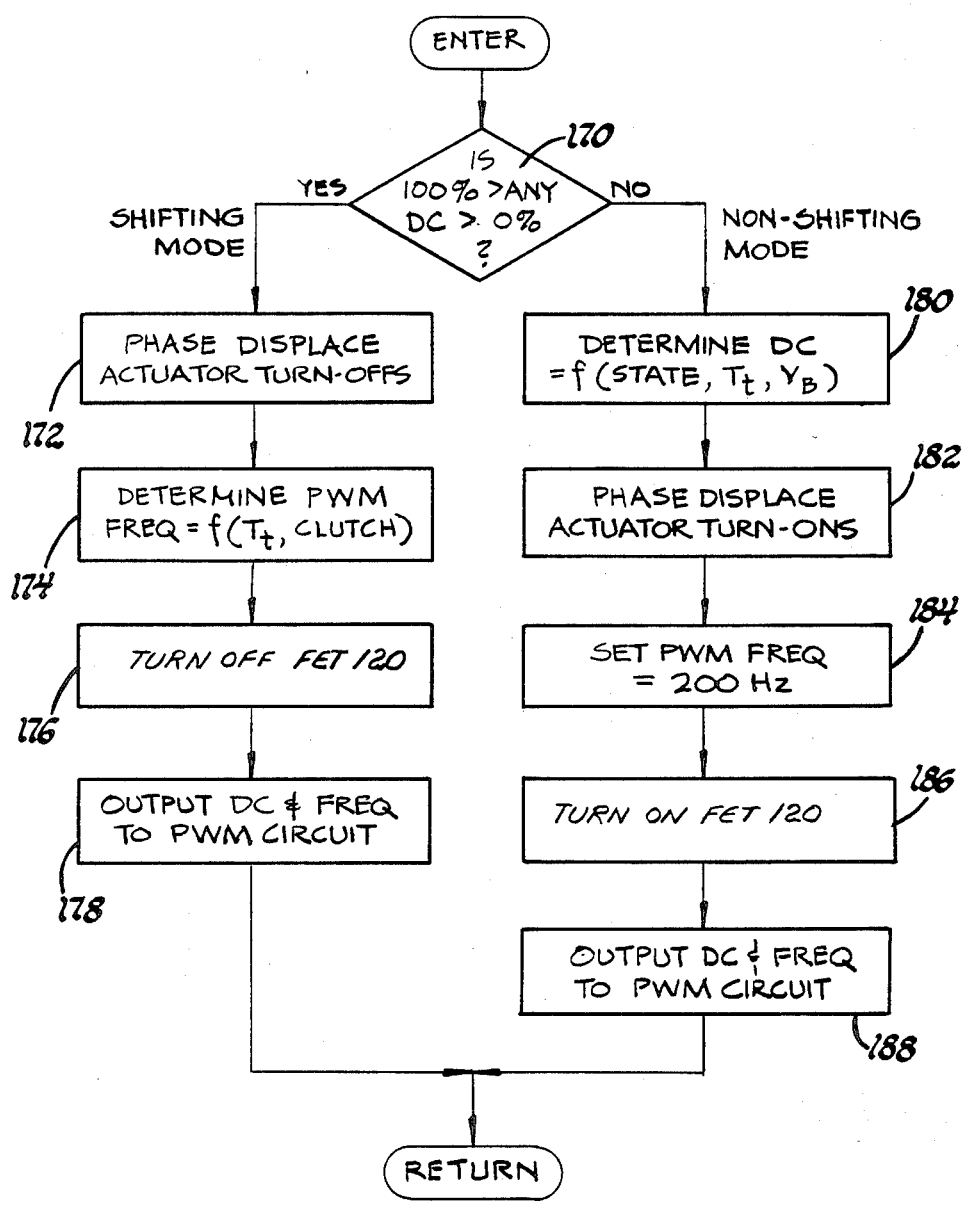

Control of the driver circuit 18 is effected by a computer-based transmission control unit 90, which may also perform other powertrain-related control functions. Input signals required for the pressure control, such as input torque and vehicle speed, are supplied to control unit 90 via lines 92. Based on such input signals, the control unit 90 develops suitable energization pulse widths and modulation frequencies for the various valves 10-16 and controls driver 18 to energize the solenoid coils 62-68 accordingly. To perform such control, the control unit 90 includes an input/output (I/0) device 94 for receiving the input signals and outputting the various driver circuit control signals, and a microcomputer 96 which communicates with the I/0 device 94 via an address-and-control bus 98 and a bidirectional data bus 99. Flow diagrams representing suitable program instructions for generating the driver circuit control outputs are depicted in FIGS. 5 and 6.

In nonshifting modes of operation, the control unit 90 and driver circuit 18 maintain the valve spools 38-44 in either the uppermost or lowermost positions to either exhaust or fully pressurize the respective transmission clutches. The control unit 90 reduces the pulse width of the applied voltage to minimize power consumption and heating, and the driver circuit 18 maintains the current in the energized solenoid coils between the PWM pulses by circulating the coil current through parallel connected free-wheeling diodes and a common current circulation path.

In shifting modes of operation, the control unit 90 deactivates the common current circulation path of driver circuit 18, thereby enabling the valve spools 38-44 to move in synchronism with the modulation of the applied voltage for accurate pressure control. Potentially damaging inductive voltage spikes caused by the quick interruption of coil current are suppressed by driver circuit 18 to protect the current switching devices therein.

Thus, the driver circuit of this invention is remotely configurable by the control unit 90, depending on the mode of transmission control (shifting or nonshifting) that is in effect. The control requirements differ for such modes, and the driver circuit 18 of this invention is configurable to serve both requirements with a minimum number of circuit elements.

For each of the solenoid operated valves 10-16, the driver circuit 18 of FIG. 1 includes an N-channel power Field-Effect-Transistor (ET) 100-106 having its source-drain circuit connected between one terminal of the solenoid coil and ground potential. The FET 100 connects the coil terminal of valve 10 to ground potential via line 74; the FET 102 connects the coil terminal of valve 12 to ground potential via line 76; the FET 104 connects the coil terminal of valve 14 to ground potential via line 78; and the FET 106 connects the coil terminal of valve 16 to ground potential via line 80. The gate terminal of each FET 100-108 is connected to the I/0 unit 94, and control unit 90 controls the various gate voltages to regulate the energization of the solenoid coils 62-68. The FETs 100-106 are driven into saturation during each energization of the respective solenoid coils 62-68, and preferably exhibit a relatively low voltage drop in such condition. In a mechanization of this invention, IRF 503 transistors, manufactured by International Rectifier Corporation, El Segundo, CA were employed.

The series combination of a dedicated free-wheeling diode 108-114 and a shared oppositely poled Zener diode 116 is connected across the source-drain circuit of each FET 100-106. The free-wheeling diode 108 and Zener diode 116 are connected across FET 100; the free-wheeling diode 110 and Zener diode 116 are connected across FET 102; the free-wheeling diode 112 and Zener diode 116 are connected across FET 104; and the free-wheeling diode 114 and Zener diode 116 are connected acros FET 106.

The junction 118 between Zener diode 116 and the free-wheeling diodes 108-114 is connected to the high side terminals of solenoid coils 62-68 via the source-drain circuit of a P-channel Field-Effect Transistor 120. The gate of FET 120 is connected to the I/0 Unit 94 and the control unit 90 regulates the gate voltage to control the FET conduction.

During nonshifting or steady state modes of operation—that is, when the energized valves are fully open to supply fluid substantially at the system pressure—the FET 120 is biased conductive by the control unit 90. In this condition, the Zener diode 116 is effectively eliminated from the circuit and the diodes 108-112 operate as free-wheeling diodes for circulating inductive energy stored in the solenoid coils 62-68 when the respective FETs 100-106 are biased nonconductive to interrupt theapplied voltage. This sustains the coil current (and therefore the magnetic force of the valve) between PWM pulses, thereby permitting the pulse width of the applied voltage to be reduced for minimizing power consumption and heating. The turn-ons or initiations of the applied voltage for the various solenoid valves 62-68 are phase displaced under such conditions to minimize or reduce the peak current through FET 120.

During shifting modes of operation—that is, when one or more of the valves 10–16 is alternately opened and closed to supply fluid at a pressure lower than the system pressure—the FET 120 is biased nonconductive by control unit 90. In this condition, the current circulation path is broken, and the Zener diode 116 operates to interrupt the current in any coil 62–68 upon interruption of the voltage applied thereto, while protecting the respective power FET 100–106 from inductive overvoltage. The turn-offs or interruptions of the applied voltage for the various solenoid coils 62–68 are phase-displaced under such conditions to minimize or lessen the peak current through Zener diode 116.

Figure 3:
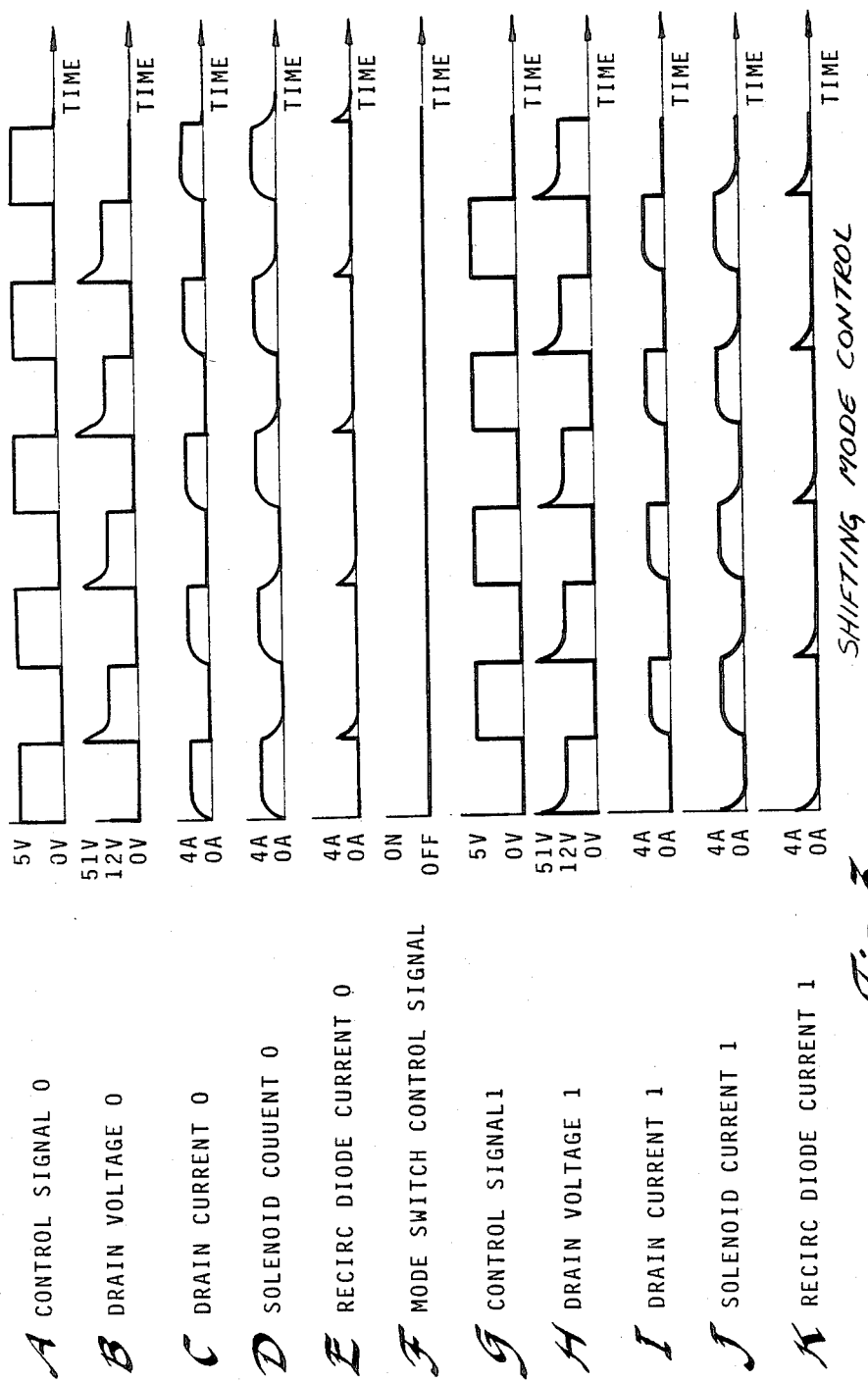
FIGS. 3 and 4 are graphs depicting the operation of the driver circuit of FIG. 1 during shifting and nonshifting modes of operation, respectively.
Figure 4:
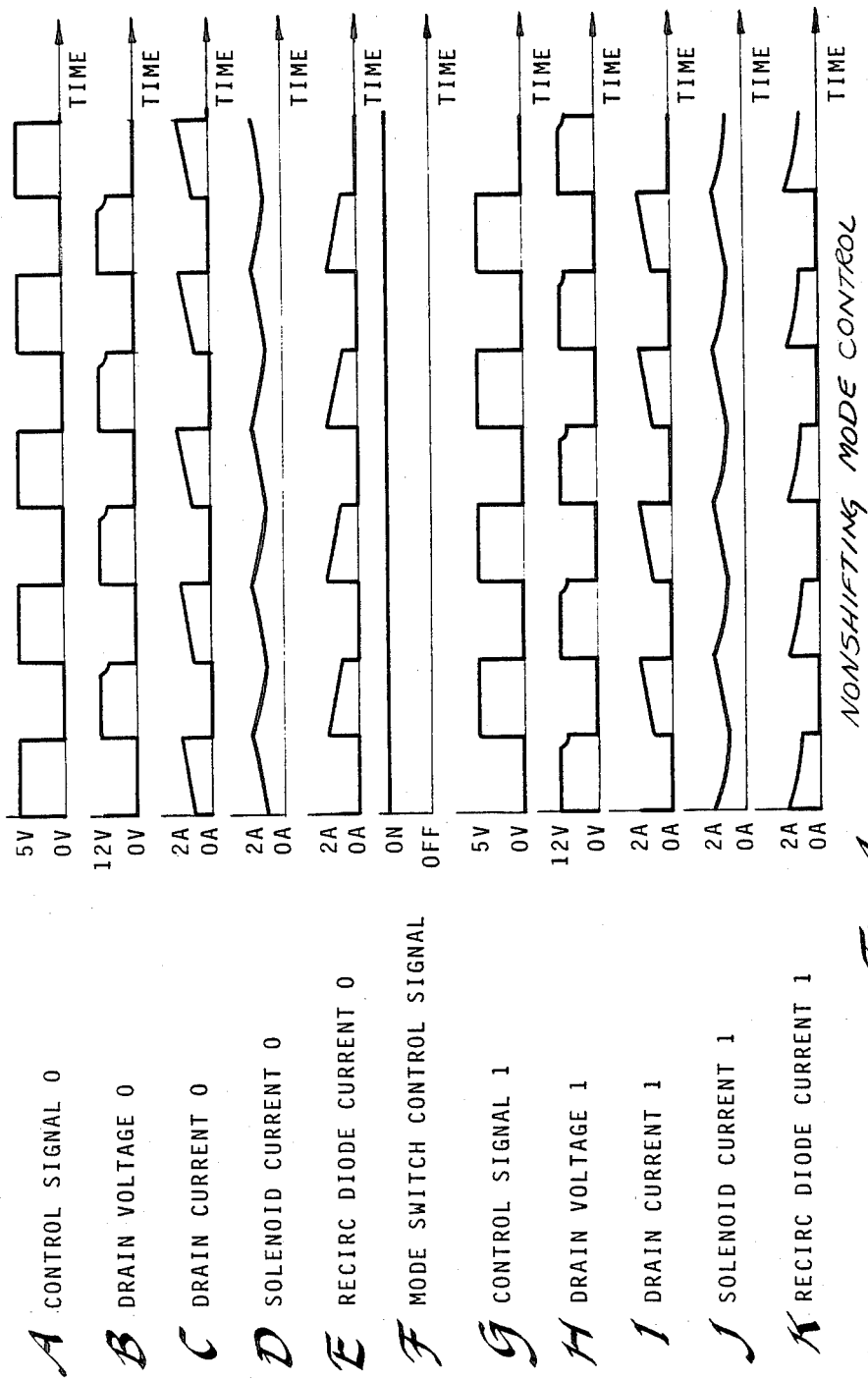

FIGS. 3 and 4 graphically depict the operation of the driver circuit 18 during shifting and nonshifting modes, respectively. The various graphs of FIG. 3 are depicted on a common time base corresponding to a PWM frequency of approximately 50 Hz; and the various graphs of FIG. 4 are depicted on a common time base corresponding to a PWM frequency of approximately 200 Hz.

Figure 2:
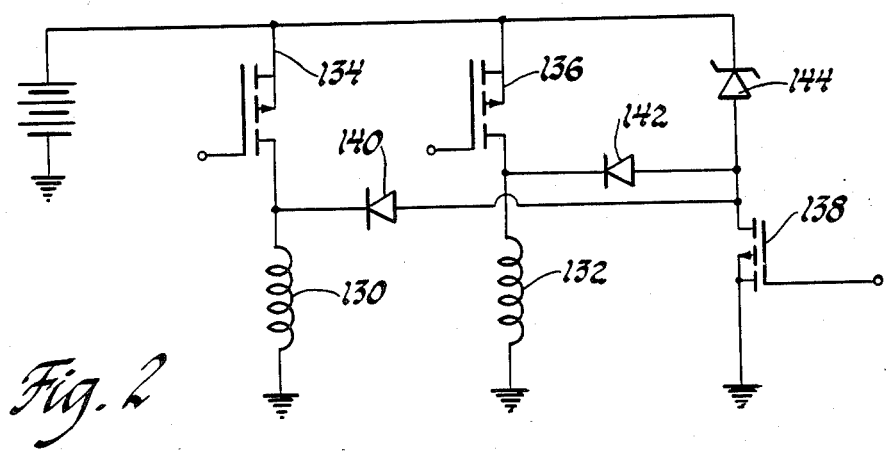

An alternate embodiment of the driver circuit 18 in which the unswitched solenoid coil terminals are connected to ground potential is schematically depicted in FIG. 2. For simplicity, only two solenoid coils 130 and 132 are represented. In such embodiment, P-channel power FETs 134 and 136 connect the switched solenoid coil terminals to the positive terminal of storage battery 20. During nonshifting modes of operation, the P-channel FET 138 is biased conductive by the control unit 90 so that the diodes 140 and 142 operate as free-wheeling diodes to circulate inductive energy through the coils 130 and 132, respectively, upon interruption of the voltage applied thereto. During nonshifting modes of operation, the P-channel FET 138 is biased nonconductive by control unit 90 to interrupt the current circulation path, and the FETs 134–136 are protected upon interruption of the applied voltage by the series combination of Zener diode 144 and the respective dedicated diode 140–142.

The flow diagrams depicted in FIGS. 5 and 6 represent program instructions to be executed by the microcomputer 96 control unit 90 in controlling the operation of driver circuit 18 according to this invention. The flow diagram of FIG. 5 represents a main or executive program which calls various subroutines for executing particular control functions as necessary. The flow diagram of FIG. 6 represents the control functions pertinent to the present invention.

Referring now more particularly to FIG. 5, the reference numeral 148 designates a set of program instructions executed at the initiation of each period of vehicle operation for initializing the various registers, timers, etc. used in carrying out the control functions of this invention. Following such initialization, the instruction blocks 150–162 are repeatedly executed in sequence as designated by the flow diagram lines connecting such instruction blocks and the return line 164.

Instruction block 150 serves to read and condition the various input signals applied to I/O device 94. Instruction block 152 serves to determine the transmission input torque $T_i$. This term is used in scheduling the various clutch pressure commands and may be computed as a function of various commonly measured powertrain parameters. Instruction block 154 determines the desired speed ratio, $R_{des}$, as a function of the driver demand and vehicle speed.

Instruction blocks 156 and 158 determine pressure commands for the pressure regulator valve PRV and the clutching devices 26–34 for both shifting and nonshifting (steady state) modes of operation. Instruction block 160 converts the clutching device and PRV pressure commands to a PWM duty cycle based on the operating characteristics of the various actuators. The instruction block 162 then controls the operation of driver circuit 18 to suitably energize the solenoid coils 62–68 of the valves 10–16. The steps comprising the output function of instruction block 162 are set forth in greater detail in the flow diagram of FIG. 6, as indicated.

Referring now particularly to FIG. 6, the decision block 170 is first executed to determine if any clutch duty cycle determined at instruction block 160 of the main loop flow diagram is greater than 0% but less than 100%. If so, a shifting mode of operation is in effect, and the instruction blocks 172–178 are executed. The instruction block 172 serves to phase-displace the interruptions of applied voltage (turn-offs) to limit the energy dissipated in the Zener diode 116. The instruction block 174 determines the frequency of pulse-width-modulation as a function of the transmission temperature $T_t$, and the clutch characteristics. The instruction block 176 biases FET 120 to a nonconductive state to interrupt the current circulation path, and the instruction block 178 energizes the respective FETs 100–106 at the commanded PWM duty cycle and frequency.

If all of the clutch duty cycles determined at instruction block 170 of FIG. 5 are either 0% or 100%, a nonshifting mode of operation is in effect and the instruction blocks 180–188 are executed. The instruction block 180 adjusts the commanded duty cycles as a function of the engaged transmission ratio, the transmission temperature $T_t$, and the storage battery voltage $V_b$. The instruction block 182 serves to phase displace the initiations of applied voltage (turn-ons) to minimize the current through FET 120. The instruction block 184 sets the frequency of pulse-width-modulation to a fixed value such as 200 Hz. The instruction block 186 biases FET 120 to a conductive state to establish a current circulation path which sustains the solenoid coil current between PWM pulses, and the instruction block 188 energizes the respective FETs 100–106 at the commanded PWM duty cycle and frequency.

In the manner described above, the solenoid driver circuit of this invention is configurable by the transmission control unit for satisfying the requirements of both shifting and nonshifting modes of operation. This capability is achieved with a single additional control lead and minimizes the number of driver circuit elements through the use of shared circuit elements.

While this invention has been described in reference to the illustrated embodiments, various modifications will occur to those skilled in the art, and driver circuits incorporating such modifications may fall within the scope of this invention, which is defined by the appended claims.

The embodiments of the invention in which an exclusive property or privilege is claimed are defined as follows:

1. In a motor vehicle multi-speed ratio transmission including a source of fluid pressure, a source of direct current, and a plurality of electromagnetic valves which receive fluid from said fluid source, and are adapted to be individually and intermittently energized with said current source during shifting modes of operation in which at least one of such valves is alternately opened and closed to supply fluid at a pressure lower than said fluid source, and nonshifting modes of operation in which the energized valves are maintained fully opened to supply fluid substantially at the pressure of said fluid source, a driver circuit for controlling energization of said valves, comprising:

energization circuit means including battery means connected to an unswitched terminal of each of said valves, and a plurality of selectively activated power switching devices, each having a pair of current carrying terminals connected between said battery means and a switched terminal of a respective one of said valves to form selectively activated energization circuits for each of said valves;

current interruption/protection means including a Zener diode connected across the current carrying terminals of each of said power switching devices, in each case, through an oppositely poled diode associated with the respective power switching device, such means being operative during said shifting modes of operation to interrupt the current supplied to the valves between intermittent energizations thereof while limiting the electromagnetic voltage thereby generated across the respective power switching devices; and current sustaining means effective during said nonshifting modes of operation for connecting a junction between said Zener diode and said oppositely poled diodes to the unswitched terminals of each of said valves, thereby to disable the operation of said current interruption/protection means, and to connect said oppositely poled diodes across the respective valves for sustaining the current in such valves between intermittent energizations thereof.

2. The driver circuit set forth in claim 1, wherein the current sustaining means comprises:

a remotely switchable auxiliary switching device having a pair of current carrying terminals connected between said junction between said Zener diode and said oppositely poled diodes and the unswitched terminals of said valves, such auxiliary switching device being adapted to be switched to a nonconductive state during said shifting modes of operation, and to a conductive state during said nonshifting modes of operation.

3. The driver circuit set forth in claim 2, comprising:

control means effective during said nonshifting modes of operation to phase-displace the intermittent energizations of said valves such that the initiations of such energizations are phase-displaced, thereby to lessen the peak current conducted by said auxiliary switching device.

4. The driver circuit set forth in claim 1, comprising:

control means effective during said shifting modes of operation to phase-displace the intermittent energizations of said valves so that the interruptions of current therein are phase-displaced, thereby to lessen the peak current conducted by said Zener diode.

5. In a motor vehicle multi-speed ratio transmission including a source of fluid pressure, a source of direct current, and first and second electromagnetic valves which receive fluid from said source and are adapted to be individually and intermittently energized with said current source during shifting modes of operation in which at least one of said first and second valves is alternately opened and closed to supply fluid at a pressure lower than said fluid source, and nonshifting modes of operation in which the energized valves are maintained fully opened to supply fluid substantially at the pressure of said fluid source, a driver circuit for controlling energization of said valves, comprising:

energization circuit means including battery means connected to an unswitched terminal of each of said first and second valves, and first and second selectively activated power switching devices, each having a pair of current carrying terminals connected between said battery means and a switched terminal of a respective one of said first and second valves to form selectively activated energization circuits each of said first and second valves;

current interruption/protection means including Zener diode means shared by said first and second power switching devices, and connected across the current carrying terminals thereof through first and second oppositely poled diode means, the Zener diode means being operative during said shifting modes of operation to interrupt the current supplied to the first and second valves between the intermittent energizations thereof while limiting the electromagnetic voltage thereby generated across the respective first and second power switching devices; and current sustaining means effective during said nonshifting modes of operation for connecting a junction between said Zener diode means and said oppositely poled diode means to the unswitched terminals of each of said valves, thereby to disable the operation of said current interruption/protection means, and to connect said oppositely poled diode means across the respective first and second valves for sustaining the current in such valves between the intermittent energizations thereof.

* * * * *